Dec. 14, 1965 L. GLADSTONE 3,223,865

TURNTABLE WITH MAGNETIC HYSTERESIS DRIVE

Filed April 27, 1962 2 Sheets-Sheet 1

*INVENTOR.*
LEWIS GLADSTONE

*BY* J. B. Burke

*ATTORNEY*

TURNTABLE WITH MAGNETIC HYSTERESIS DRIVE

Filed April 27, 1962 2 Sheets-Sheet 2

INVENTOR.
LEWIS GLADSTONE
BY J. B. Burke
ATTORNEY

United States Patent Office 3,223,865
Patented Dec. 14, 1965

3,223,865
TURNTABLE WITH MAGNETIC HYSTERESIS DRIVE
Lewis Gladstone, 177—44 Troutville Road, Springfield Gardens, N.Y.
Filed Apr. 27, 1962, Ser. No. 190,531
6 Claims. (Cl. 310—103)

This invention relates to magnetically driven turntables for use in high fidelity sound recording and reproduction equipment and is particularly applicable to apparatus employed for phonograph record disks as well as magnetic tape.

Heretofore, turntables employed in phonograph record players and recorders as well as magnetic tape equipment, have been driven by direct mechanical coupling of gears, capstans, belts, pulleys, rollers or other drive members to the turntables. The mechanical coupling members are driven by electric motors of various types. Such prior mechanical drives have suffered from the following defects and disadvantages among others:

(1) Spurious mechanical vibrations are set up between the driving motor and the turntable parts. These vibrations are transmitted to the recording or reproducing stylus causing the objectionable sound characteristic known as "rumble" in turntables.

(2) Erratic mechanical vibrations are transmitted to the turntable parts resulting in unsteady pitch in sound reproduction, generally known as "flutter."

(3) Regular or erratic rotational speed variations in the motor or other parts result in unsteady pitch of sound recorded or reproduced.

(4) Frictional slippage between the turntable and the mechanical driver, varying tension in drive belts and pulleys, accumulation of dust and debris in the mechanical driver, and deterioration with age of the driver, all result in both transient and permanent speed changes in the turntable, which degrade the quality of sound recorded and reproduced.

(5) The direct mechanical coupling of the turntable with its mechanical driver produces objectionable mechanical and acoustic noises while the parts are rotating in contact with each other.

(6) Precise alignment of parts is required, including true parallelism of drive shafts for acceptable high quality sound reproduction. However, this precise alignment is frequently lost due to rough handling in shipment and in use of the apparatus, resulting in slippage or misalignment of drive belts and/or other parts, and loss of high fidelity in sound recording and reproduction.

(7) Complex mechanisms and/or delicate and precise adjustments are required to compensate for varying mechanical drive conditions; and these require highly skilled operators or technicians not ordinarily available in homes and other places where high quality equipment may be installed.

The present invention has as a principal object provision of a novel hysteresis drive for a turntable which overcomes the difficulties, defects, and disadvantages heretofore encountered with mechanical drives for turntables, capstans, and the like in acoustic equipment.

A further object is to provide a turntable including magnetic hysteresis drive means without direct mechanical connection or coupling between the drive means and the driven turntable.

Other objects are to provide a magnetic drive for a turntable which is simple in operation and construction; which substantially eliminates rumble and flutter; which is rugged in construction; which generates no friction noises; which provides for multi-speed operation; which is adaptable for apparatus employing phonograph record disks or magnetic tape; and which is adaptable for use with conventional types of turntables.

According to the invention, there is provided a circular or cylindrical permanent magnet driven by an electric motor. This may be a clock-type of motor. The magnet is multi-poled along its circumference or periphery. The magnet is rotated by the motor at a constant speed. The magnet's periphery is disposed adjacent to a circumferential flange or ring of a freely rotatable turntable, but spaced therefrom by an air gap. The ring is made of a magnetic material, preferably one having a high retentivity of magnetization, and may be made of an alloy of steel including cobalt, chromium, carbon, etc. During rotation of the magnet, a local magnetization circuit is set up in the ring. The magnetization of the ring and resistance to demagnetization of the ring due to its hysteresis characteristic result in development of a relative torque between the rotating magnet and the ring, so that the turntable is rotated without relative slippage when carrying less than predetermined maximum load. The diameter of the ring is many times that of the magnet so that the magnetic coupling between the magnet and turntable is equivalent to a speed decreasing magnetic "gear." The turntable and magnet rotate in synchronism, without mechanical contact between the two. The magnetic engagement between the rotating magnet and the ring is positive and non-slipping so that the ring starts to rotate as soon as the magnet rotates. The ring rotation is thus self-starting.

The invention will be best understood from the following detailed description taken together with the drawing, wherein.

Figure 1:
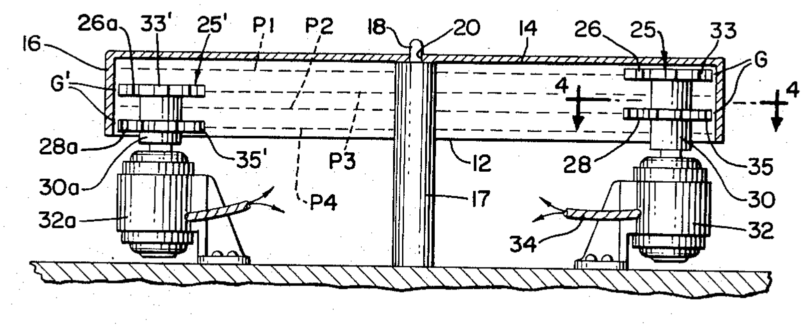
FIG. 1 is a vertical, central sectional view through a turntable including drive means embodying the invention, shown partially in side elevation and partially diagrammatically.

Referring first to FIGS. 1–4, there is shown a phonograph turntable 12 including a flat circular top plate 14 and depending peripheral cylindrical skirt or ring 16. The turntable is freely rotatable on a centrally located post 17 having a spindle 18 inserted through a hole 20 in the top plate to engage a phonograph record disk. The post may be stationary and secured to a suitable mounting base 22. Located just inside the ring 16 and separated therefrom by a narrow air gap G is a magnet assembly 25. This assembly includes a pair of vertically spaced disk magnets 26, 28 horizontally disposed parallel to plate 14. The disk magnets are secured to an axially vertical shaft 30 of a motor 32. The motor may be of synchronous type energized via electric cable 34 from a remote source of power. Other driving means than electric motors may be used to mount the magnets if desired.

Figure 3:
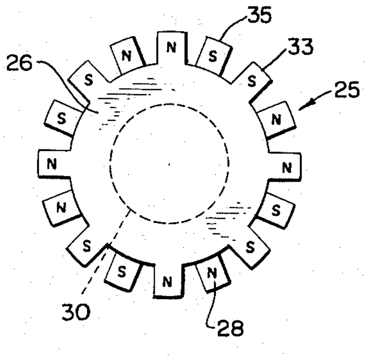
FIG. 3 is a top plan view of the assembly of FIG. 2.
Figure 2:
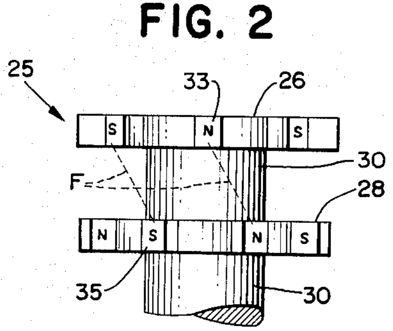
FIG. 2 is a side elevational view on an enlarged scale of part of a magnet driver assembly employed in the apparatus of FIG. 1.

The disk magnets have radially extending salient poles 33, 35 alternately polarized north (N) and south (S); see FIGS. 2 and 3. The upper poles 33 are offset with respect to the lower poles 35 of the same polarity so that magnetic fields F which are approximately skewed are induced by the two disk magnets.

Figure 4:
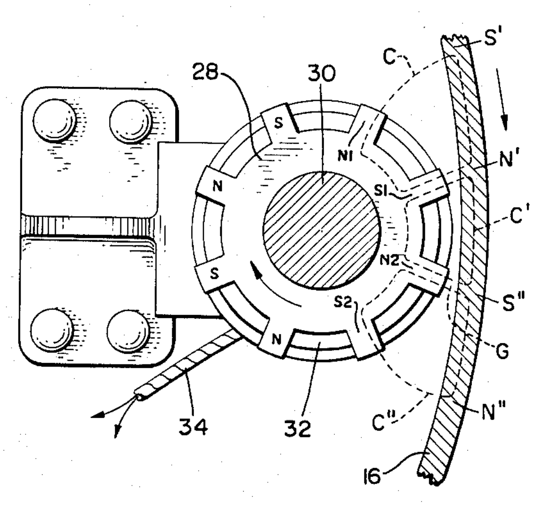
FIG. 4 is a fragmentary sectional view on an enlarged scale taken on line 4—4 of FIG. 1 and illustrating schematically a mode of operation of the invention.

FIG. 4 illustrates three adjacent magnetic circuits C, C' and C'' existing between the ring 16 and the poles of the disk magnet 28 which are closest to the ring. It will be noted that the ring is temporarily and locally magnetized by magnetic induction in the area adjacent to the disk magnet. As the disk magnet is rotated on shaft 30, pole $N_1$ will induce pole S' and will repel pole N' induced in the ring by pole $S_1$. Pole $S_1$ will repel pole S'' previously induced by pole $N_2$. Pole $N_2$ will repel pole N'' previously induced by pole $S_2$. Thus a mutual torque is developed between the magnet and ring causing the turntable 12 to rotate. As each pole of the magnet in turn approaches the ring, a slight shifting occurs in the position of the pole induced in the ring in the direction of travel of the ring. This results in a smooth locking into engagement of each pole of the magnet with each induced pole in the ring while a simultaneous gradual release in magnetic engagement occurs with respect to the receding pole of the magnet and the collapsing pole induced thereby in the ring.

By providing two spaced disk magnets having alternately offset poles defining independent skewed magnetic circuits a smoother and more continuous torque is developed between the magnet assembly and turntable than if only a single disk magnet had been used.

A second assembly 25' of disk magnets 26a, 28a is located in a diametrally opposite position from the assembly 26, 28 and spaced by air gap G' from ring 16. These disk magnets also have radial alternating N and S salient poles 33', 35' offset from each other to define skewed magnetic circuits. The disk magnets are mounted on axially vertical shaft 30a of motor 32a. By providing two cooperating torque developing assemblies of magnets to drive the turntable 12 it is possible to employ smaller motors than would be required if only one motor and one magnet assembly were used. Also smaller magnets may be used; and thinner less costly steel can be used for the turntable, since less hysteresis effect is required. It will be noted that magnet 26a is on a lower horizontal plane than magnet 26 and is located in a plane between magnets 26 and 28. Magnet 28a is located in a plane below magnet 28. If any magnetized points in paths P1 and P2 should remain in the ring 16 as it rotates around magnets 26, 28, these magnetized points or paths will not interfere with the magnetization of the ring 16 by magnets 26a, 28a since the paths or planes of magnetization P3, P4 of magnets 26a, 28a are vertically offset from the paths P1, P2. Thus the two sets of magnets cooperate with each other to insure constantly applied torque without interfering with each other. The staggering in elevation of the several magnets at opposite sides of the turntable insures that any residual magnetization remaining at the end of a half turn of the turntable away from one assembly of magnets will not interfere with the torque developed by the other set of magnets.

Figures 5, 6, 7, 8, 9, 10:
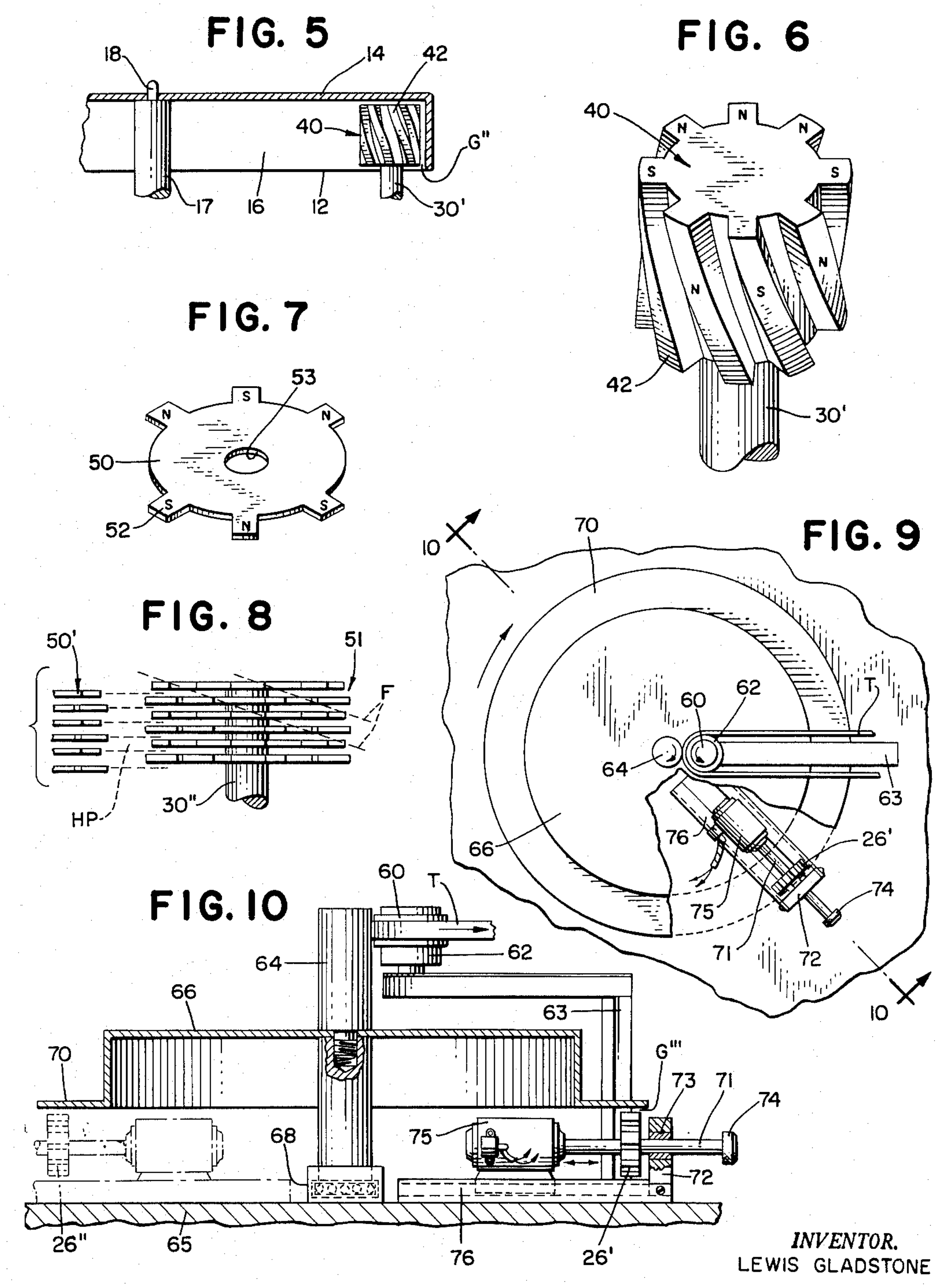
FIG. 5 is a fragmentary sectional view similar to a part of FIG. 1 showing another form of magnet driver.
FIG. 6 is a perspective view on an enlarged scale of the magnet driver employed in the assembly of FIG. 5.
FIG. 7 is a perspective view of another form of magnet driver.
FIG. 8 is a side elevational view of part of another magnet driver assembly employing a plurality of magnets of the type shown in FIG. 7.
FIG. 9 is a top plan view on a reduced scale of a tape drive apparatus embodying another form of the invention.
FIG. 10 is a vertical sectional view on an enlarged scale taken on line 10—10 of FIG. 9.

FIGS. 5 and 6 show another magnet driver 40 for turntable 12. This magnet is cylindrical or disk shaped and is disposed axially vertical on motor shaft 30'. The magnet has radial circumferentially spaced alternating north (N) and south (S) salient poles 42 which are helically skewed axially of the magnet. The magnet 40 is disposed adjacent to turntable ring 16 with air gap G'' in between. When this magnet rotates, a smooth magnetic coupling is developed between the ring and magnet. The magnetization of the ring 16 develops on skewed lines downwardly from the top to the bottom of the ring as the magnet rotates. Torque is developed between the top of each pole and ring just as development of torque between the bottom of the preceding pole and ring terminates. This construction insures constant applied torque which is so necessary for high fidelity sound recording and reproducing apparatus. Two helical magnet drivers 40 may be provided in diametrally opposed positions with respect to the turntable ring if desired.

FIGS. 7 and 8 illustrate another magnet driver which is in the form of a thin wafer or disk magnet 50 having alternating radial N and S poles 52. A hole 53 is provided for mounting the magnet on shaft 30'' of the motor. An assembly 51 of vertically spaced disk magnets 50 may be provided on the shaft as shown in FIG. 8, for driving the turntable in place of magnets 26, 28. A companion assembly of disk magnets 50' similar to magnets 50 may be provided in a diametrally opposed position to replace the magnets 26a, 28a. The magnets 50 will be disposed in horizontal planes HP located between the planes of disk magnets 50 to avoid the interference of magnetization paths with torque development, as explained above in connection with magnets 26a, 28a. The poles will be offset to define axially skewed fields F'.

FIGS. 9 and 10 show another form of the invention in which a magnetic tape T is driven between an idler roller 60 having a friction sleeve 62 thereon engaging vertical rotating shaft 64 carrying turntable 66. The roller 60 is mounted on a bracket 63 supported on mounting base 65. Shaft 64 is rotatably mounted in a bearing assembly 68 supported on base 65. The turntable 66 has a radially extending horizontal annular flange or ring 70 which is spaced by air gap G''' from axially horizontal disk magnet 26'. This magnet may be the same as magnets 26 or 40 or any of magnet assemblies 25, 25' or 50. The magnet is supported on a horizontal shaft 71 rotatable and axially movable and adjustable in a bearing bracket 72 having a radial sleeve bearing 73. A knob 74 can be grasped for manually positioning the magnet radially with respect to ring 70. The shaft 71 extends from motor 75 which is held in a channel member 76 to which bracket 72 is attached. The motor is movable in the channel and moves with magnet 26' when the shaft 71 is pulled axially outward or is pushed axially inward with respect to the turntable and ring.

Driving torque will be developed between the magnet driven by the motor 75 via shaft 71. It will be apparent that the radial distance of the drive point on ring 70 from shaft 64 will depend on the radial location of the magnet 26' underneath the ring. If the operator moves the magnet and motor to the right or radially outward with respect to shaft 64 as viewed in FIG. 10, the speed of rotation of the turntable will decrease. If the operator moves the magnet and motor to the left as viewed in FIG. 10, the speed of rotation of the turntable 66 will increase. This arrangement makes it possible for the operator to vary the speed of drive of tape T at will. A similar variable speed drive arrangement can be applied to the turntable 12 employed for phonograph record disks. Two cooperating magnets 26', 26'' or two multiple disk magnet assemblies may be employed in diametrally opposed positions under ring 70.

The present invention makes it possible to employ very small inexpensive permanent magnets which may be stamped or pressed out of thin sheet material and permanently magnetized. The turntable rings may be stamped out of thin alloy steel by conventional metal forming machinery. The invention makes it possible to provide a higher quality turntable drive for high fidelity acoustic purposes at lower cost and with better acoustic results, than has hitherto been available.

All embodiments of the invention as described above employ rotatable cylindrical or circular disk magnets having a discrete number of salient poles. However it will be understood that in certain applications the cylindrical or circular magnets may be made with smooth peripheries each having a discrete number of equally spaced magnetic poles alternating successively in polarity, and the poles on the smooth peripheries may be inclined or skewed axially of the magnets in the same manner as illustrated in the drawing for magnets with salient poles.

An important feature of the invention is that all magnets are permanently magnetized and this magnetization does not materially decrease during the useful life of the equipment in which they are installed, thus driving torque does not decrease during the life of the equipment.

What is claimed and sought to be protected by Letters Patent of the United States is:

1. A magnetic hysteresis drive for high fidelity sound recording or reproducing apparatus, comprising a rotatable turntable having an unmagnetized peripheral ring formed of hysteresis material having a high retentivity of magnetization, a pair of cylindrical permanent magnet structures disposed in circumferentially spaced positions adjacent to the ring and radially spaced therefrom by narrow air gaps, each of said magnet structures having alternating peripheral north and south poles, and drive means respectively supporting and driving the magnet structures on their axes, whereby the magnet structures each magnetically induces local magnetic fields in the ring to develop torque between the magnet structures and the ring for cooperatively rotating the turntable while the magnet structures rotate simultaneously, each of the magnet structures including two parallel spaced disks, the magnetic poles on one disk being circumferentially offset from and disposed between the magnetic poles on the other disk, to induce said magnetic fields in substantially skewed paths in said ring.

2. A magnetic hysteresis drive for high fidelity sound recording or reproducing apparatus, comprising a rotatable turntable having an unmagnetized peripheral ring formed of hysteresis material having a high retentivity of magnetization, a pair of cylindrical permanent magnet structures disposed in circumferentially spaced positions adjacent to the ring and radially spaced therefrom by narrow air gaps, each of said magnet structures having alternating peripheral north and south poles, and drive means respectively supporting and driving the magnet structures on their axes, whereby the magnet structures each magnetically induces local magnetic fields in the ring to develop torque between the magnet structures and the ring for cooperatively rotating the turntable while the magnet structures rotate simultaneously, each of the magnet structures including two parallel axially spaced disks, the magnetic poles on one disk being circumferentially offset from and disposed between the magnetic poles on the other disk to induce said magnetic fields in substantially skewed paths in said ring, the disks of one magnet structure being disposed in a first pair of axially spaced planes, the disks of the other magnet structure being disposed in another pair of axially spaced planes axially offset from the first pair of spaced planes so that the magnetic fields induced by the magnetic poles in the ring lie in circumferentially spaced non-interfering paths in the ring.

3. A magnetic hysteresis drive for high fidelity sound recording or reproducing apparatus, comprising a self-starting rotatable turntable having an unmagnetized peripheral ring formed of hysteresis material having high retentivity of magnetization, a substantially cylindrical permanent magnet structure disposed adjacent to said ring and spaced therefrom by a narrow gap, said magnet structure having alternating peripheral north and south poles, and drive means axially supporting and rotating said magnet structure on its axis, whereby said poles in turn magnetically induce local magnetic fields in said ring, said fields shifting slightly in the direction of travel of the ring as each pole of the magnet in turn approaches the ring to develop uniform torque and non-slipping positive magnetic engagement between the magnet structure and ring for continuously rotating the turntable while the magnet structure rotates at constant speed, said magnet structure including two axially spaced disks, the poles on one disk being circumferentially offset from and disposed between the poles on the other disk so that the magnetic fields induced in the ring are substantially skewed in the ring.

4. A magnetic hysteresis drive for high fidelity sound recording or reproducing apparatus, comprising a self-starting rotatable turntable having an unmagnetized peripheral ring formed of hysteresis material having high retentivity of magnetization, a substantially cylindrical permanent magnet structure disposed adjacent to said ring and spaced therefrom by a narrow gap, said magnet structure having alternating peripheral north and south poles, and drive means axially supporting and rotating said magnet structure on its axis, whereby said poles in turn magnetically induce local magnetic fields in said ring, said fields shifting slightly in the direction of travel of the ring as each pole of the magnet in turn approaches the ring to develop uniform torque and non-slipping positive magnetic engagement between the magnet structure and ring for continuously rotating the turntable while the magnet structure rotates at constant speed, the poles of said magnet structure being axially skewed so that the magnetic fields induced in the ring are skewed in the ring.

5. A magnet hysteresis drive for high fidelity sound recording or reproducing apparatus, comprising a self-starting rotatable turntable having an unmagnetized peripheral ring formed of hysteresis material having high retentivity of magnetization, a substantially cylindrical permanent magnet structure disposed adjacent to said ring and spaced therefrom by a narrow gap, said magnet structure having alternating peripheral north and south poles, and drive means axially supporting and rotating said magnet structure on its axis, whereby said poles in turn magnetically induce local magnetic fields in said ring, said fields shifting slightly in the direction of travel of the ring as each pole of the magnet in turn approaches the ring to develop uniform torque and non-slipping positive magnetic engagement between the magnet structure and ring for continuously rotating the turntable while the magnet structure rotates at constant speed, said magnet structure including a plurality of thin wafers axially spaced apart so that the magnetic fields induced by the magnetic poles of each wafer are substantially separate from the fields induced by the poles of the other wafers, the poles on the several wafers being circumferentially offset so that the fields induced in the ring are substantially skewed.

6. A magnetic hysteresis drive for high fidelity sound recording or reproducing apparatus, comprising a self-starting rotatable turntable having an unmagnetized peripheral ring formed of hysteresis material having high retentivity of magnetization, a substantially cylindrical permanent magnet structure disposed adjacent to said ring and spaced therefrom by a narrow gap, said magnet structure having alternating peripheral north and south poles, and drive means axially supporting and rotating said magnet structure on its axis, whereby said poles in turn magnetically induce local magnetic fields in said ring, said fields shifting slightly in the direction of travel of the ring as each pole of the magnet in turn approaches the ring to develop uniform torque and non-slipping positive magnetic engagement between the magnet structure and ring for continuously rotating the turntable while the magnet structure rotates at constant speed, the poles of the magnet structure being substantially helical so that substantially helical magnetic fields are induced in the ring.

(References on following page)

References Cited by the Examiner

UNITED STATES PATENTS

| | | | |
|---|---|---|---|
| 2,527,237 | 10/1950 | Wilcox | 310—103 X |
| 2,722,617 | 11/1955 | Cluewen | 310—103 |
| 2,807,734 | 9/1957 | Lehde | 310—103 |
| 2,902,612 | 9/1959 | Whearley | 310—105 |

FOREIGN PATENTS

| | | |
|---|---|---|
| 899,731 | 9/1944 | France. |
| 366,943 | 2/1932 | Great Britain. |
| 389,450 | 6/1931 | Great Britain. |

ORIS L. RADER, *Primary Examiner.*

DAVID X. SLINEY, *Examiner.*